Fig. 1

INVENTOR.
ALEX J. BARNA
BY Stanley J. Price, Jr.
His ATTORNEY

Dec. 16, 1969     A. J. BARNA     3,484,628
MOVING COIL ELECTROMECHANICAL DRIVE MEANS FOR A MOSSBAUER
EFFECT VELOCITY SPECTROMETER
Filed Feb. 1, 1966     4 Sheets-Sheet 2

Fig. 2

PRIOR ART

INVENTOR.
ALEX J. BARNA
BY
Stanley J. Price, Jr.
His ATTORNEY

INVENTOR.
ALEX J. BARNA
BY
Stanley J. Price, Jr.
His ATTORNEY

United States Patent Office 3,484,628
Patented Dec. 16, 1969

3,484,628
MOVING COIL ELECTROMECHANICAL DRIVE MEANS FOR A MOSSBAUER EFFECT VELOCITY SPECTROMETER
Alex J. Barna, 1216 Crawford St., Duquesne, Pa. 15110
Filed Feb. 1, 1966, Ser. No. 523,984
Int. Cl. H02k 41/00
U.S. Cl. 310—13
11 Claims This invention relates, in general, to apparatus for measuring nuclear resonant absorption of radiation penetrating a material containing the absorbing nuclei. In particular, this invention concerns an electromechanical drive unit adapted for use with such apparatus.

In the technology of nucleonics, it is known that an unstable isotope of a chemical element can change to another unstable isotope or to a stable isotope of the same or a different element by the emission, from the atoms of the unstable isotope, of certain forms of radiation such as gamma radiation. A gamma ray can be characterized or described according to the frequency and wave length of the electromagnetic waves comprising the gamma ray. However, the frequency and wave length of a gamma ray are functions of the total energy content of the gamma ray and, more commonly, gamma rays are classified according to their total energy content which is expressed in units of electron volts (ev.), or, more conveniently, in units of thousand electron volts (kev.).

When gamma radiation passes through a material a number of events can occur. Some of the radiation travels a substantially direct path through the material without any interaction between that radiation and the atoms comprising the material through which the radiation has passed. Another portion of the radiation interacts with the planetary electrons of various atoms comprising the material and is either scattered or absorbed by the planetary electrons. Still another portion of the radiation is scattered or absorbed by nuclei of atoms present in the material.

Because the atomic nucleus is of much greater physical dimension than any of the individual planetary electrons, much of the absorption of radiation that occurs during transmission of gamma rays through a material is dependent upon the structure and nature of the atomic nuclei present therein. In consideration of all of the factors tending to affect the likelihood of absorption of gamma radiation by nuclei in the material through which the radiation passes, the probability that absorption will occur can be expressed as a quantity referred to as the "cross section" of the atom under consideration. The cross section of a particular atom is not only a function of the actual diameter or breadth of the atom but is also a function of the composition and structure of the nucleus of the atom and of the energy content of the gamma radiation available for interaction with the atom. It is known, in fact, that the cross section of many atoms varies as a function of the energy content of the radiation available for interaction with the atom and that many atoms exhibit extremely large cross sections for certain narrow and well-defined energy levels of radiation.

A radioactive nucleus exists at an energy level that is generally characterized as being an unstable, or excited, state and can be transformed to a stable nucleus by loss of the energy of excitation by radioactive decay, often passing through one or more additional unstable states before reaching the level of a stable nucleus which has no energy of excitation. An example of such a process of radioactive decay is exhibited by the unstable isotope cobalt 57, which exists at an energy level of 570 kev. and has a half life of 270 days. The cobalt 57 nucleus loses energy by the emission of radiation and passes thereby to an intermediate excited state having an energy level of 137 kev. and a half life of $8.0 \times 10^{-9}$ second. That intermediate unstable nucleus release additional energy by the emission of radiation and passes to a lower energy unstable nucleus known as iron $57m$ (metastable iron) having an energy level of 14.4 kev. and a half life of $1.0 \times 10^{-7}$ second. Ultimately, the iron $57m$ nucleus decays to a stable state of iron 57 by the emission of gamma radiation having an energy of 14.4 kev.

Originally, it was thought that each time a radioactive nucleus emits a gamma ray, the nucleus is forced to recoil in a direction opposite to the direction of emission of the gamma ray. Owing to recoil to the emitting nucleus, the wave length of the gamma ray, and hence the energy level of the gamma ray, is changed. Similarly, it was originally thought that each time a nucleus absorbs a gamma ray, the absorbing nucleus is forced to recoil in a direction coincident with the direction of travel of the absorbed gamma ray. Thus, although the absorbing nucleus is excited to a higher energy level by absorption of the gamma ray, the resultant energy level of the absorbing nucleus is not equal to the total energy of the absorbing gamma ray, but is, instead, equal to an energy level that is less than the energy of the gamma ray by the amount of energy dissipated by recoil of the nucleus.

It has been found that, contrary to earlier hypothesis, certain excited nuclei can absorb gamma radiation without recoil and certain stable nuclei can absorb gamma radiation without recoil. This phenomenon is known as nuclear resonant absorption, or the Mossbauer effect. In the process of nuclear resonant absorption, the emitted gamma ray is emitted without a change in wave length or energy level, owing to the recoilless emission, and the total energy of the absorbed gamma ray is dissipated in raising the stable absorbing nucleus through its transition energy to the excited state. The radioactive decay of cobalt 57 to stable iron 57 provides an example of the occurrence of nuclear resonant absorption because the metastable nucleus, iron $57m$, undergoes a recoilless emission of the 14.4 kv. gamma ray. If that gamma ray encounters a stable iron 57 nucleus, it is absorbed without recoil.

The preceding discussion is presented herein as background for the following discussion of the concept of the invention disclosed herein. A more detailed discussion of nuclear resonant absorption and an extensive list of pertinent references are presented in a publication entitled "The Mossbauer Effect: A Tool For Science," by G. K. Wertheim, Nucleonics, January 1961, pages 52 to 57. The significance of the Mossbauer effect to the concept of the present invention is explained below.

A particular process of radioactive decay is unique for any particular unstable nucleus. In addition, the occurrence of recoilless nuclear resonant emission and absorption by a particular pair of unstable and stable nuclei is a unique phenomenon that is characteristic of certain particular pairs of nuclei. For example, in addition to the pair of cobalt 57 and iron 57 discussed above, recoilless resonant emission and absorption of gamma radiation is exhibited by such pairs of unstable and stable nuclei as gallium 67 and zinc 67, wolfram 181 and tantalum 181, osmium 193 and iridium 193, and others. The Mossbauer effect has proved useful in the study of such matters as the energy levels of certain excited nuclear states, the lifetimes of which are unknown, the zero energy and specific heat of crystal systems, the interactions between the nucleus and the planetary electrons of various atoms, the local force fields in various ferromagnetic and antiferromagnetic substances, and the nature of the chemical bond existing among atoms in various chemical compounds.

The occurrence of resonant absorption of gamma radiation exhibited by a particular radiation source and radiation absorber can be detected if the source is placed in spaced alignment with respect to a detector for gamma radiation, such as a scintillation counter or a proportional ionization counter, and the absorber is interposed between the source and the detector. Nuclear resonant absorption occurs because, for the particular energy level of the incident gamma ray, the absorbing nucleus has an unusually high absorption cross section, and the amount of radiation that is transmitted through the absorbing material is substantially reduced. Therefore, for a particular source and a particular absorber, when resonant absorption is absent, the counting rate of transmitted gamma rays per unit time sensed by the detector is relatively high. However, when nuclear resonant absorption occurs, the transmitted radiation sensed by the detector is significantly reduced.

One other physical phenomenon is of fundamental importance to the concept of this invention. There has been described above the recoilless resonant emission and absorption of gamma radiation in a physical system in which both absorber and source are at rest so that the relative velocity between source and absorber is zero and the wave length and energy of the gamma ray is charatceristic of the energy levels of the source and absorbing nuclei. It has been found that, when sources and absorbers capable of recoilless emission and absorption are employed, resonant absorption of the radiation, accompanied by a significant decrease in radiation transmitted through the absorber, can occur when the relative velocity between source and absorber is finite and other than zero. Furthermore, if a graph is made of the counting rate of the detected transmitted gamma radiation as a function of the magnitude of the relative velocity induced between the radiation source and absorber, a resulting velocity spectrum of the Mossbauer effect is obtained which is characteristic of the particular source-absorber pair employed and which provides additional physical data which enhances the utility of the Mossbauer effect as an analytical tool.

Heretofore, many types of apparatus adapted for use as Mossbauer effect velocity spectrometers have been described in the literature. Among those spectrometers, that which is most pertinent to the concept of this invention is described in a publication entitled "Velocity Spectrometer For Mossbauer Experiments," by E. Kankeleit, The Review of Scientific Instruments, vol. 35, No. II, February 1964, pages 194 to 197. With reference to spectrometer apparatus having a gamma ray source, an absorbing material, and a detector all in spaced axial alignment, Kankeleit describes electromechanical drive means that is connected to either the source or the absorber to impart a relative linear velocity to the source-absorber pair.

The drive means described by Kankeleit comprises two loud speaker systems connected front to front with brass bolts and an aluminum tube secured between the two loud speaker systems as a spacer. Each of the loud speaker systems comprises a cylindrical magnetic member having an annular magnetic member around one end thereof with the surfaces of the cylindrical and annular magnetic members maintained in spaced relation with each other. A magnetic field of about 5,000 gauss is produced in the radial air gap between the cylindrical and annular magnetic members.

A transducer, comprising an elongated shaft having a pair of cup-shaped coil forms connected thereto, is enclosed in passages extending through the center of each of the cylindrical magnetic members with each of the ends of the shaft slidably secured in a resilient support member that is connected to the drive means adjacent the end of each cylindrcial magnetic member remote from the other cylindrcial magnetic member. The transducer is mounted in the support members with the surfaces of the shaft spaced from the surfaces of the cylindrical magnetic members surrounding the passages therethrough. The open end of each of the coil cups extends into the air gap between a cylindrical magnetic member and its related annular magnetic member with the surfaces of the coil cups maintained in spaced relation with the surfaces of each of the magnetic members. The drive unit described by Kankeleit includes soft iron magnetic members, a Bakelite transducer shaft and a coil form consisting of a Bakelite tube with a medial portion of its length having a reduced diameter that is adapted for stationary engagement with the medial portion of the shaft when the Bakelite tube is pressed and molded onto the shaft in assembly. Kankeleit also describes a drive coil that is wound on one coil cup and a pickup coil that is wound on the other coil cup in the air gaps between the cylindrical and annular magnetic members.

An electrical potential applied to the drive coil results in a flow of current through the coil in the magnetic field with a resultant linear thrust applied to the transducer in a direction substantially parallel to the longitudinal axis of the shaft. Passage of alternating current through the drive coil results in linear oscillation of the transducer in the magnetic field. The linear oscillation of the transducer shaft, induced as described above, is imparted also to the pickup coil in the magnetic field of the other loud speaker system, thereby inducing in the pickup coil a flow of current having a magnitude proportional to the linear velocity of the transducer, and the leads of the pickup coil are connected to a multichannel analyzer for storage and recording of the velocity data.

The electromechanical drive unit can be connected by an extension from the shaft of the transducer to either the source or the absorber of the Mossbauer effect spectrometer. Thereafter, in operation, the relative velocity between source and absorber is controlled by the voltage applied to the drive coil and the resulting current flow therethrough; the counting data of the detector are read into the multichannel analyzer; the velocity data sensed by the pickup coil are also read into the multichannel analyzer; the velocity data, counting rate data, and analyzer channel selection are synchronized by suitable apparatus incorporated with the analyzer; and an error signal, derived as a function of the pickup coil signal, is fed to a signal generator adapted to control the driving voltage applied to the drive coil and vary that voltage over a preselected range in a manner adapted to provide the desired velocity spectrum. The particular details of structure of analyzer means, detecting means, and control means that are suitable for use with the apparatus described herein are not critical to the concept of this invention and are not presented herein with any further specificity. The structural details of one suitable embodiment of such apparatus can be obtained from the publication of Kankeleit that was described above.

Whatever the drive apparatus employed to induce a relative velocity between source and absorber in a Mossbauer effect velocity spectrometer, the intra-atomic and intra-molecular distances are such that any oscillation or vibration arising in the drive mechanism will affect adversely the accurate and valid determination of the occurrence or nonoccurrence of nuclear resonant absorption based upon the detection of transmitted gamma radiation by the detecting means. Furthermore, when the drive means is adapted to impart to the source and absorber a relative velocity within a predetermined range of velocities, it is highly desirable that the drive mechanism be capable of producing a substantially constant acceleration of the source or absorber.

In the study of physical and chemical phenomena, especially with the development of space technology, it has become desirable to examine the Mossbauer effect in evacuated and cryogenic environments. The electromechanical drive mechanism described by Kankeleit, while effecting a substantial improvement in the operation of a Mossbauer effect velocity spectrometer, is subject to a substantial and heretofore insurmountable disadvantage inherent in the use of such apparatus in an evacuated and/or cryogenic enviroment. Passage of the drive current through the drive coil in an evacuated or cryogenic system results in inoperability of the mechanism described by Kankeleit owing to the generation of and failure to dissipate, excessive heat arising from the resistance to flow of current through the drive coil. Attempts to use the Kankeleit apparatus under such conditions have resulted in destruction of that apparatus and a production of inaccurate and imprecise physical data that do not constitute a valid description of the nuclear phenomena of interest.

It is an object of this invention to provide an electromechanical drive unit for use with a Mossbauer effect velocity spectrometer that can be used in evacuated and/or cryogenic environments.

It is a further object of this invention to provide an electromechanical drive unit for a Mossbauer effect velocity spectrometer having improved electrical and mechanical operating efficiencies.

Another object of this invention is the provision of an electromechanical drive unit for a Mossbauer effect velocity spectrometer capable of providing a relative velocity between source and absorber of the spectrometer with a substantially constant acceleration.

It is another object of this invention to provide a Mossbauer effect velocity spectrometer in which vibration and disturbance of the desirably constantly accelerated linear velocity is minimized.

Suitable embodiments of this invention are illustrated in the accompanying drawings in which.

This invention resides in an improved electromechanical drive means for a Mossbauer effect velocity spectrometer. The drive means of this invention comprises an outer housing consisting of end members separated by an intermediate tubular member; connecting means adjoining the structural elements of the housing members together in a rigid unit; each of the end members of said housing having an opening extending through the end wall thereof; a pair of resilient metallic supporting members connected to opposite ends of the housing, each of the supporting members having a hole extending therethrough positioned in coaxial alignment with the opening through the housing end member adjacent to the resilient supporting member. Each of a pair of magnetic means, mounted in opposite ends of the housing in spaced relation with each other comprises a cylindrical magnetic member abutting the end of the housing and extending inwardly therefrom toward the other magnetic means and an annular magnetic member rigidly secured in the housing and surrounding the inner end of the cylindrical magnetic members; each of the magnetic means having its annular magetic member rigidly mouted in spaced relation to the corresponding cylindrical magnetic member; each of the cylindrical magnetic members having a central passage extending longitudinally therethrough in coaxial alignment with both the opening in the end of the housing member and the hole extending through the resilient mounting means; and the pair of magnetic means defining therebetween, in combination with the intermediate spacer member of the housing, an enclosed central chamber.

The improved transducer of this invention comprises an elongated metal shaft enclosed within the housing means and extending through the central passage through each of the cylindrical magnetic members, through the opening in each of the housing end wall, and through the holes in each of the resilient metal support members. The shaft is slidably secured in the holes of the resilient support members with the surface of the shaft maintained in spaced relation to the surfaces of the cylindrical magnetic members and the surfaces of the housing means. In addition, the transducer comprises metal coil mounting means integral with the shaft about its intermediate portion, the coil mounting means comprising a metal drive coil cup and a metal pickup coil cup, each extending from the housing chamber into the radial space between the adjacent magnetic members and each having its open end facing the adjacent end of the shaft and having a closure integral with the shaft at the other end of the coil cup, with the closure of each coil cup facing the other coil cup. Each of the coil cups has, near the open end thereof, a coil channel, consisting of a circumferential recessed groove cut around the outer wall of the coil cup, and a plurality of electrical connecting means integral with each of the coil cups near the closed end thereof. Each coil cup has wound in the channel thereof a coil of electrically conductive wire with the leads of the coil connected to the electrical connecting means near the closed end of the coil cup. Each coil channel and the coil contained therein preferably are constructed and arranged such that the outer radius of the coil measured from the central longitudinal axis of the transducer shaft is not greater than the radius measured from the central longitudinal axis of the shaft to the outer surface of the coil cup between the coil channel and the closed end of the coil cup.

In one embodiment of the transducer of this invention, each coil cup is unitary with the shaft and the coil cups are separated from each other by an intermediate portion of the shaft extending therebetween; in another embodiment of the transducer of this invention, each coil cup is unitary with an end of a tubular spacer sleeve with the closed end of each coil cup facing the closed end of the other coil cup which is unitary with the other end of the spacer sleeve. Either of those structures for the coil mounting means can comprise an additional preferred element of structure in which the shaft or sleeve between the coil cups comprises a plurality of radial or arcuate sections that are joined together by a suitable electrically nonconductive bonding material that bonds the sections together in assembly to form a rigid shaft or sleeve.

In a preferred embodiment of this invention, each coil cup has integral therewith electrical conduit means extending from the open end of the coil cup through the channel toward the electrical connecting means of the coil cup near the closed end thereof, with the electrical conduit means constructed and arranged such that the coil lead contained therein is maintained below the outer surface of the coil cup throughout the section of the coil cup that is position in the radial space between the cylindrical and annular magnetic members.

In another preferred embodiment of this invention, each of the coil cups has extending through the wall thereof a plurality of elongated slots. In an additional preferred embodiment of this invention, each coil cup has extending through the closure thereof a plurality of ports. In another preferred embodiment of this invention, the electrical connecting means on each coil cup is positioned to form a circumferential arc extending around the outer surface of the side wall of the coil cup near the closed end thereof.

Figure 1:
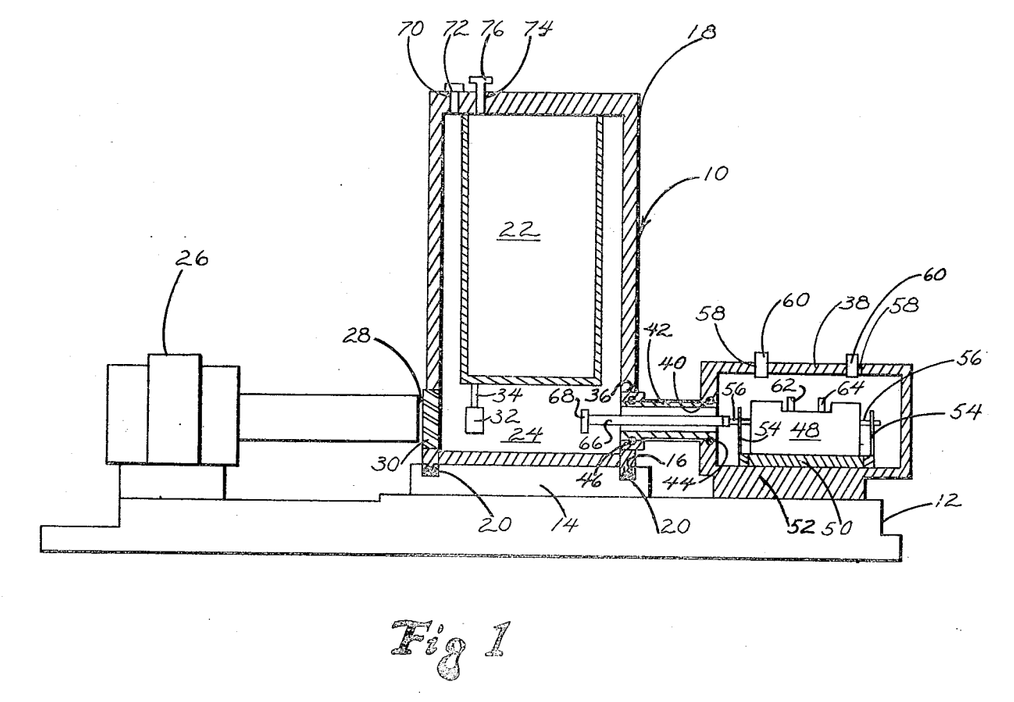
FIGURE 1 is a diagrammatic representation, partially in cross section, of the components of a Mossbauer effect velocity spectrometer suitable for use with this invention.

The structural details of the apparatus of this invention are described herein with reference to the accompanying drawings. FIGURE 1 shows a Mossbauer effect velocity spectrometer indicated generally by reference numeral 10, that is adapted to detect nuclear resonant absorption in an evacuated and cryogenic environment. The spectrometer comprises a metallic base 12 constructed of steel, alumuminum, or other suitable metal. A mounting plate 14 is connected to the upper surface of base 12 near the center thereof and has a circular groove 16 formed in the upper surface thereof. A cylindrical metal container 18 is connected at its lower end in groove 16 of mounting plate 14. An O-ring 20, constructed of resilient deformable material such as rubber, is secured between the bottom of groove 16 and the bottom of contain 18 to provide therebetween a fluid-tight seal. A cylindrical metallic receptacle 22 is suspended within container 18 from the top thereof with the bottom of receptacle 22 vertically spaced from the lower end of container 18 and the upper surface of mounting plate 14. An enclosed chamber 24 is formed between the inner surface of container 18, the outer surface of receptacle 22 and the top of mounting plate 14.

A detector 26 for gamma radiation is represented diagrammatically in FIGURE 1 and is connected to base 12 in spaced relation with the side of container 18 with the entry 28 of detector 26 positioned adjacent the side wall of container 18 at a level between the bottom of receptacle 22 and the top of mounting plate 14. Container 18 has a window 30 in the side wall thereof adjacent entry 28 of detector 26. Window 30 is constructed of a metal, such as beryllium, or other rigid material that is substantially transparent to gamma radiation. Any suitable connecting means can be used to secure window 30 in the side wall of container 18 as long as that connecting means is capable of effecting a fluid-tight seal between window 30 and the surrounding side wall of container 18. Detector 26 is connected to suitable data recording and analyzer means (not shown in the drawing) and to suitable control means (not shown in the drawing). As was indicated above, the nature and construction of the particular data recording and analyzer means and of the control means are not critical to the novel aspects of this invention and are not discussed here in detail.

An absorber 32 is shown diagrammatically in FIGURE 1 connected by a rigid metal member 34 to the bottom of receptacle 22 and suspended in vacuum chamber 24 near and adjacent to window 30. Absorber 32 can consist of a material that is known to be capable of nuclear resonant absorption when used in conjunction with a suitable radioactive source material or, alternatively, absorber 32 can consist of a material, the constituents and properties of which are unknown or only partially determined.

Container 18 has an opening 36 formed in the side wall thereof in diametric opposition to window 30. A metal vacuum casing 38 is mounted on base 12 adjacent opening 36 in the side wall of container 18. A rigid tube 42 is secured at one end in hole 40 of casing 38 and is secured at its other end in opening 36 of container 18. An O-ring 44 is secured in compression between the end of tube 42 and the wall of casing 38 surrounding hole 40, and an O-ring 46 is secured in compression between the opposite end of tube 42 and the wall of container 18 surrounding opening 36. Both of the O-rings 44 and 46 are constructed of resilient deformable material such as rubber and are constructed and arranged in assembly to form a fluid-tight seal between the ends of tube 42 and the walls of container 18 and casing 38.

Electromechanical drive means 48 is enclosed in casing 38 and has a metal drive means base 50 connected to and abutting a metal base 52 of casing 38. Drive means 48 has integral therewith a pair of resilient metal support members 54 connected to base 50 of drive means 48. A metal shaft 56 extends through drive means 48 with its opposite ends slidably secured in support members 54. An important structural aspect of the apparatus of this invention, which will be described more explicitly below, is that the apparatus be constructed with a continuity of contact between adjacent metal parts including the ends of shaft 56, resilient support members 54, drive means base 50, the base 52 of casing 38, and the spectrometer base 12, which construction is arranged to provide a continuous path for the conduction of heat from drive means 48 to spectrometer base 12 with the dissipation of that heat into the atmosphere.

Casing 38 has in the upper surface thereof a pair of ports 58 adapted to receive a pair of electrical connectors 60 which are constructed and arranged to provide fluid-tight engagement between each of the connectors 60 and its associated port 58. A plurality of electrical leads extend through each of connecting means 60 for connection to electrical connectors 62 and 64 extending upwardly from the top of drive means 48. One set of electrical leads contained in a connector 60 is connected to an electrical power source (not shown in the drawing) adapted to actuate the drive means 48, and another set of electrical leads contained in the other connector 60 is connected to the analyzer and control means discussed above.

A rod 66 is movably enclosed in tube 42 and is connected by any suitable means at one end to an end of shaft 56. The end of rod 66 that is remote from shaft 56 and drive means 48 extends into chamber 24 within container 18 and has connected thereto a radioactive source 68 vertically spaced between the bottom of receptacle 22 and the upper surface of mounting plate 14 and horizontally spaced from and aligned with absorber 32. Source 68 contains a material, such as cobalt 56, that is capable of effecting nuclear resonant emission and absorption of gamma radiation.

Container 18 has a vacuum port 70 extending through the top thereof and opening into the annular space of chamber 24 between the wall of container 18 and the wall of receptacle 22. Valve means 72 is secured in vacuum port 70 in fluid-tight engagement with the wall of container 18 surrounding vacuum port 70. Container 18 also has a fluid passage 74 extending through the top thereof and opening into receptacle 22. Valve means 76 is secured in fluid passage 74 in fluid-tight engagement with the wall of container 18 surrounding fluid passage 74. Valve means 72 is connected to a vacuum pump (not shown in the drawing) and valve means 76 is connected to a source of cryogenic fluid (not shown in the drawing).

In operation, detector 26, drive means 48, casing 38 and tubing 42 are assembled on the base 12. Container 18 is then mounted on mounting plate 14 with source 68 and rod 66 connected to shaft 56 of drive means 48 and with absorber 32 connected to the bottom of receptacle 22. Chamber 24 is evacuated through vacuum port 70 and valve means 72. Then a cryogenic fluid, such as liquid nitrogen, liquid helium, or other suitable liquid, is introduced into receptacle 22 through fluid passage 74 and valve means 76 to reduce the temperature in chamber 24. In the above manner, both source 68 and absorber 32 are maintained in an evacuated environment under cryogenic conditions. As will be explained more fully below, drive means 48 is actuated to impart an oscillatory linear motion to shaft 56, rod 66 and source 68. Alternatively, source 68 can be secured to the bottom of receptacle 22, and absorber 32 can be connected by suitable means to the linearly oscillating shaft 56 of drive means 48. It is not critical to the concept of this invention which of source 68 and absorber 32 is oscillated while the other is held stationary, as long as a controlled relative velocity is induced between source and absorber with the absorber interposed between the source and the entry of the detector.

Figure 2:
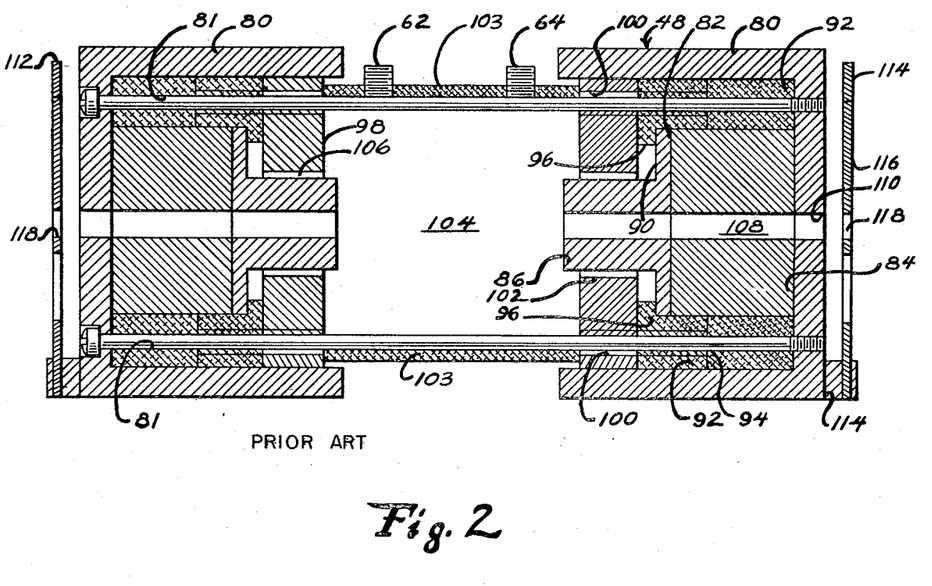
FIGURE 2 is a view in longitudinal cross section, of the housing and magnetic means of the electromechanical drive means of this invention.

FIGURE 2 shows part of the structure of the electromechanical drive means 48 which comprises a housing consisting of a pair of iron cup-shaped housing end members 80 secured together in spaced relation with their open ends facing each other by a plurality of brass bolts 81. Each housing end member 80 has secured therein a permanent cylindrical magnetic member 82 hereinafter referred to as a magnetic member 82 which includes a section 84 having a large diameter and abutting the inner end wall of the adjacent housing end member 80. Each of cylindrical magnetic members 82 also has a small diameter section 86 facing the adjacent cylindrical magnetic member, and the juncture between larger diameter section 84 and smaller diameter section 86 of each cylindrical magnetic member 82 forms a shoulder 90.

Cylindrical magnetic member 82 is centralized within its associated housing end member 80 by an annular aluminum spacer 92. Each of spacers 92 has a plurality of longitudinal openings 94 therethrough adapted to receive a bolt 81, whereby spacer 92 is immovably secured within housing end member 80. The inner end of spacer 92; that is, the end remote from the end wall of housing end member 80, has an inwardly extending shoulder 96 adapted to overlap and engage shoulder 90 of cylindrical magnetic member 82.

An annular iron magnetic member 98 is secured in housing end member 80 in abutting relation with the end of spacer 92 remote from the end wall of housing end member 80. Annular magnetic member 98 has a plurality of passages 100 extending therethrough adapted to receive the shaft of a bolt 81 whereby annular magnetic member 98 is immovably secured within housing end member 80. An aluminum sleeve 103 is held in compression in abutting relationship between the adjacent annular magnetic members 98 and serves the dual purposes of rigidifying the housing and magnetic structural elements of drive means 48 while defining an enclosed chamber 104 between the magnetic members secured within the opposite housing end members 80.

Annular magnetic member 98 has a central passage 102 extending therethrough constructed and arranged to surround the smaller diameter section 86 of cylindrical magnetic member 82 while defining a radial air gap 106 between the surface of annular magnetic member 98 surrounding passage 102 and the outer surface of the smaller diameter section 86 of cylindrical magnetic member 82. Each cylindrical magnetic member 82 has extending therethrough a central longitudinal passage 108. In addition, each of housing end members 80 has a central opening 110 extending through the end wall thereof in alignment with passage 108.

Figure 6:
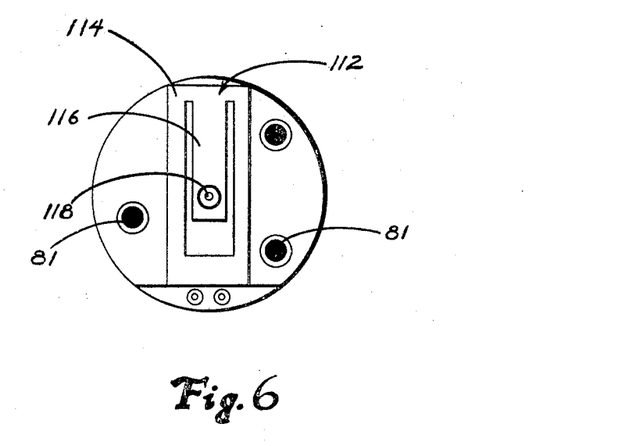
FIGURE 6 is an elevational view of resilient supporting means that slidably engages the ends of the transducer shaft at either end of the housing of the drive means of this invention.

A resilient metal support member 112 is connected at its lower end by suitable means 114 to the lower outer surface of each of housing end members 80. A resilient support member 112 found suitable for use with the apparatus of this invention comprises a lever spring, as shown in FIGURE 6, constructed of Phosphor bronze and comprising a rectangular frame 114 having a flexible elongated central member 116 suspended from the upper end of frame 114 and extending downwardly past opening 110 through the end wall of the adjacent housing end member 80. Central member 116 has a hole 118 extending therethrough in alignment with opening 110 in housing end member 80 and passage 108 through cylindrical magnetic member 82. In assembly, the housing, the magnetic members, and the support members of drive means 48 have extending longitudinally therethrough a continuous elongated receptacle defined by the combination of chamber 104, central passages 108 through cylindrical magnetic members 82, central openings 110 through the end walls of housing end members 80, and holes 118 in supporting members 112. Electrical connectors 62 and 64, shown diagrammatically in FIGURES 1 and 2, are secured by threads or other suitable means in the wall of aluminum sleeve 103 between housing end members 80.

Figure 3:
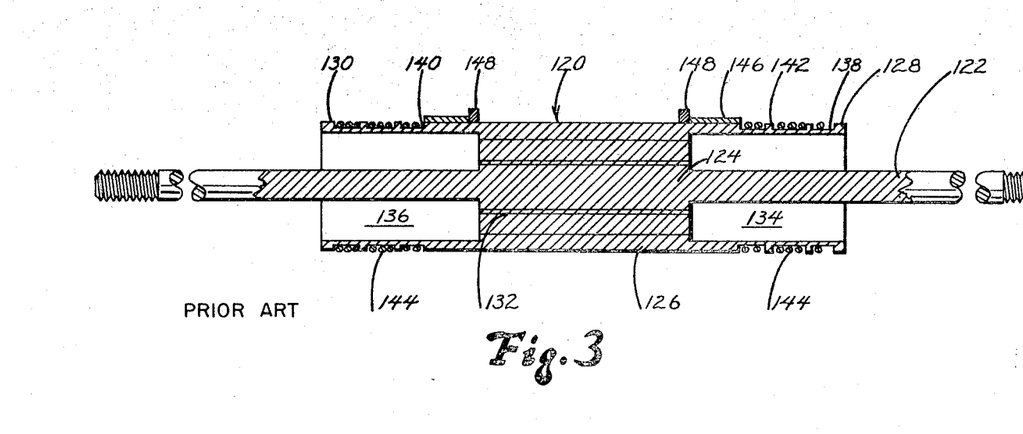
FIGURE 3 is a view in longitudinal cross section of the transducer means employed with electromechanical drive units for Mossbauer effect velocity spectrometers heretofore described in the prior art.

The structural elements of the electromechanical drive unit that are shown in FIGURE 2 are substantially the same in the drive means as described in the prior art and as employed in the apparatus of this invention. To aid in describing and particularly pointing out the novel improvements in the apparatus of this invention as compared to the apparatus described in the prior art, there is shown in FIGURE 3 a transducer, indicated generally by reference numeral 120, as employed and described in the prior art, and adapted for enclosure within the housing of drive means 48 shown in FIGURE 2. Transducer 120, consists of Bakelite shaft 122 having a central portion 124 of larger diameter than the rest of the shaft. Coil mounting means consists of a Bakelite cylinder 126 having hollow end portions forming a pickup coil cup 128 and a drive coil cup 130. A hole 132 extends through the center of cylinder 126 between the openings 134 and 136, respectively, of coil cups 128 and 130. Cylinder 126 is compressed and bonded into rigid engagement with the central portion 124 of shaft 122.

In assembly, transducer 120 is mounted within the other structural members of drive means 48 with shaft 122 extending through passages 108, openings 110 and holes 118 and with the side walls of coil cups 128 and 130 extending into air gaps 106 between the associated magnetic members. Shaft 122 is slidably secured in hole 118 of central member 116 of resilient support member 112. One end of shaft 122 has threadably or otherwise secured thereto a nut or other suitable stop means adjacent the side of support member 112 remote from housing end member 80 to limit linear displacement of transducer 120 through drive means 48. The other end of shaft 122 has integral therewith threads or other connecting means adapted for connection with one end of rod 66 to impart a linear velocity to source 68 as shown in FIGURE 1.

It should be noted that, when transducer 120 is assembled with the rest of drive means 48, the surface of shaft 122 is mounted in spaced relation with the surface of cylindrical magnetic means 82 surrounding passage 108 and in spaced relation with the surface of the end wall of housing end member 80 surrounding opening 110. In addition, the inner and outer surfaces of the side walls of coil cups 128 and 130 are mounted in air gap 106 in spaced relation with the adjacent surfaces of the cylindrical magnetic members 82 and the annular magnetic members 98. With such construction, transducer 120 is free-floating in the rest of the drive means 48 except for the slidable engagement between shaft 122 and central member 116 of support member 112.

In transducer 120 each of coil cups 128 and 130 has a coil channel 138 and 140 respectively formed by cutting a circumferential groove in the outer surface of the side wall of each coil cup. Each of channels 138 and 140 is separated into three separate segments by ridges 142. Coils 144 are wound on each of coil cups 128 and 130 in channels 138 and 140 with coil leads 146 extending from coil 144 to terminal post 148 connected to the walls of coil cups 128 and 130 near the closed end thereof.

In operation of the drive means shown in FIGURES 1, 2 and 3, electrical leads extend from terminal posts 148 through connectors 62 and 64 to the connectors 60 in casing 38. According to conventional practice, coils 144 are secured in channels 138 and 140 by coating the coils with a suitable lacquer or varnish which hardens to form a rigid bond among the coil windings on the surfaces of the coil cup. Attempts to use the apparatus shown in FIGURES 2 and 3 in an evacuated cryogenic environment have indicated that such apparatus is inoperable in that environment because heat generated by the passage of electrical current through the coils is not dissipated and eventually causes destruction of the coil windings and the transducer. In addition, the accumulated heat raises the temperature within casing 38, tube 42 and chamber 24 to temperatures higher than those amenable with the cryogenic conditions desired. The heat thus generated during the use of the drive means shown in FIGURES 2 and 3 cannot be dissipated in an evacuated environment because of the inability of that apparatus to conduct the heat generated in the coils away from the body and vicinity of the transducer at a rate sufficient to prevent destruction of the drive means components and of the cryogenic conditions.

Figure 4:
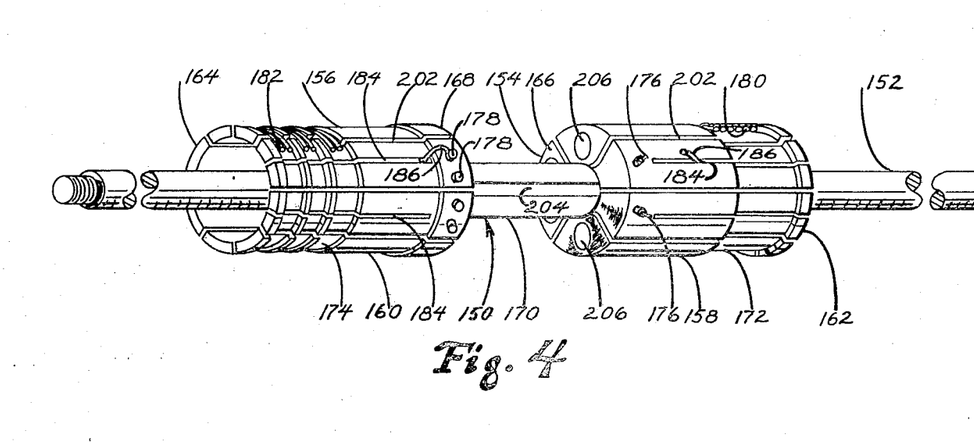
FIGURE 4 is an isometric view of the transducer means of this invention in which the mounting means for the drive and pickup coils comprises a pair of tubular coil cups having longitudinal slots cut through the walls thereof and having conduit means comprising a plurality of slits cut through the walls of the coil cups.
Figure 5:
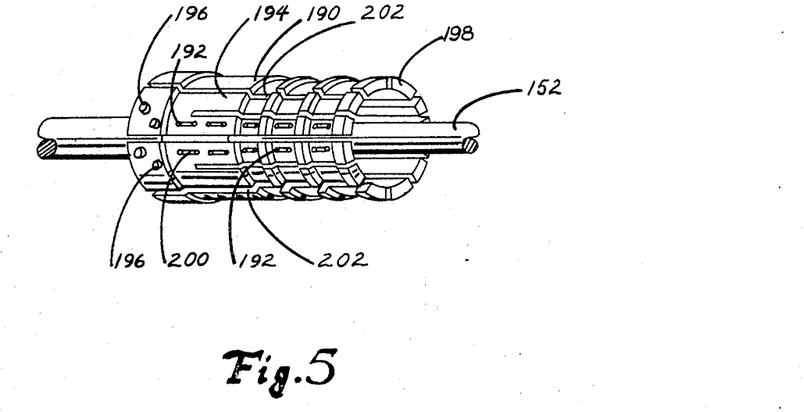
FIGURE 5 is a fragmented isometric view showing a coil cup having a plurality of elongated slots cut through the wall thereof and having conduit means comprising a plurality of sets of apertures and grooves in the wall of the coil cup oriented linearly between the open end of the cup and electrical mounting means positioned near the closed end of the cup.

The novel aspects of this invention are illustrated in FIGURES 4 and 5 and comprise an electromechanical transducer that is operable in evacuated and cryogenic environments and that is operable with greater efficiency in all physical environments. FIGURE 4 shows a metal transducer, indicated generally by reference numeral 150, which is preferably constructed of a light weight metal such as aluminum. Transducer 150 comprises an elongated metal shaft 152 having integral therewith a drive coil cup 154 and a pickup coil cup 156. Coil cups 154 and 156 are metal and are preferably constructed of a light weight metal such as aluminum. Coil cups 154 and 156 are positioned on shaft 152 in spaced relation with each other. Each of coil cups 154 and 156 has an open end 162 and 164 respectively, facing the adjacent end of shaft 152. In addition, each of coil cups 154 and 156 has a closure 166 and 168 at the end of each coil cup facing the adjacent coil cup.

In one embodiment of the apparatus shown in FIGURE 4, closures 166 and 168 are unitary with, or otherwise rendered integral with, the surface of shaft 152. In another embodiment of the apparatus shown in FIGURE 4, closures 166 and 168 are integral with the ends of a metal sleeve 170 having an internal diameter adapted for stationary engagement with the medial portion of shaft 152. In that embodiment of the apparatus having coil cups 154 and 156 integral with opposite ends of sleeve 170, the medial portion of shaft 152 can be provided, if desired, with a larger diameter than the rest of shaft 152, similar to the structure shown in FIGURE 3 at 124 along the body of shaft 122.

A circumferential drive coil channel 172 is cut around the outer surface of the side wall 158 of drive coil cup 154 near the open end 162 thereof. A circumferential pickup coil channel 174 is cut in the outer surface of the side wall 160 of pickup coil 156 near the open end 164 thereof. Pickup coil channel 174 comprises three separate portions similar to the construction of the coil channels described in the prior art. However, drive coil channel 172 consists of a single channel and that structure has proved operable in combination with the other modifications of structure in the transducer of this invention. Drive coil 180 is wound in channel 172 and pickup coil 182 is wound in channel 174. Both coils are rigidified and bonded to the surfaces of their respective coil cups by the application to coils 180 and 182 of a suitable hardenable lacquer or varnish such as those conventionally used for that purpose. A plurality of terminal posts 176, or other suitable electrical connecting means, is secured in side wall 158 of drive coil cup 154 near closure 166. Similarly, a plurality of terminal posts 178, or other suitable electrical connecting means, is mounted in side wall 160 of pickup coil cup 156 near closure 168.

It is an important aspect of this invention that the outer surface of the coil wires be maintained, in assembly, below the outer surfaces of the respective coil cups interposed in the radial air gap 106. Such structure enables closer spacing among the surfaces of the coil cups and the surfaces of the adjacent cylindrical and annular magnetic members. As a result of such closer spacing among the coil cups and the magnetic members, each coil is positioned in a magnetic force field of greater magnitude than is possible with the structure of the prior art, and the quantity of the electric current flowing through the drive coil required to achieve the desirable displacement and velocity of the transducer is substantially reduced. Thus the amount of heat generated by passage of the electrical current through the coil is reduced and that heat which is generated can be dissipated through the metal structural members of the transducer to the metal support members supporting the transducer and therethrough to the metal housing of the drive means to the metal base supporting the drive means.

In accordance with the above described advantages of this invention, each of coil channels 172 and 174 and coils 180 and 182 is constructed and arranged in assembly such that the radial distance from the center of shaft 152 to the outer surface of coil 180 and 182 is not greater than the radial distance from the center of shaft 152 to the outer surface of side walls 158 and 160 of coil cups 154 and 156, respectively. In addition, each of coil cups 154 and 156 has integral therewith electrical conduit means shown in FIGURE 4 as a plurality of elongated slits 184 cut through the side wall of the coil cup and extending from the open end thereof through the channel toward terminal posts 176 and 178. The construction of the conduit means is identical in each of the coil cups 154 and 156. The electrical wires extending from the coil to the terminal post are passed under the coil through slit 184 to the associated terminal 176 or 178. Each of the coil leads secured in a slit is encased in a tubular insulating sleeve 186 of electrically nonconductive material such as nylon or plastic to prevent contact between the coil lead and the surfaces of the metal coil cup.

The number of slits in a coil cup is determined by the number of terminal posts and coil leads required. Slits 184, coil leads and sleeves 186 are constructed and arranged in assembly such that the radial distance from the central longitudinal axis of shaft 152 to the outer surface of sleeve 186 is not greater than the radial distance from the central longitudinal axis of shaft 152 to the outer surface of the side wall of the coil cup. It should be noted that it is necessary to retain the coil surface, the coil leads, and the sleeves 186 below the level of the outside surface of the coil cup only over that portion of the coil cup which is inserted into air gap 106 between the associated cylindrical and annular members. An alternative construction of the apparatus of this invention, therefore, comprises slits of lengths such that the coil leads, in the sleeves 186, are supported on the outer surface of the portion of the coil cup side wall that is within chamber 104. It is desirable that sleeve 186 have an internal diameter large enough to allow the passage of the coil lead therethrough and an external diameter such that sleeve 186 is held in compression in its associated slit 184. The dimensions of slit 184 and sleeve 186 are not critical in any aspects other than those specified immediately above.

An alternative structure for the electrical conduit means of this invention appears in FIGURE 5 wherein there is shown a coil cup 190 having a plurality of sets of apertures 192 extending through the side wall 194 of the coil cup. Coil cup 190 is provided with a set of apertures for each terminal post 196, and the apertures in a particular set are positioned in a substantially straight line extending from near the open end 198 of coil cup 190 to near the terminal 196. Alternate pairs of apertures 192 in a particular set of apertures are connected by a groove 200 cut in the outer and inner surfaces of side wall 194 of the coil cup between adjacent apertures. When the conduit means shown in FIGURE 5 is employed, the coil leads are encased in a flexible insulating sleeve like sleeve 186 described with reference to FIGURE 4, and the sleeve and coil lead are threaded from the coil through the apertures and grooves alternately along the inner and outer surfaces of side wall 194 to terminal post 196. Grooves 200 have a depth such that the outer surface of the insulating sleeve containing the coil lead does not extend past the surface of side wall 194. The insulating sleeves with the enclosed coil leads can be bonded to the surface of side wall 194 by the application thereto of a suitable lacquer or varnish.

The use of a metal transducer having the structure described above renders the transducer of this invention more efficient in all environments and operable in vacuated and cryogenic environments. A further improvement in the transducer of this invention is achieved by incorporating therewith means to reduce the magnitude of eddy currents induced in the metal members of the transducer. One means suitable for reducing the magnitude of such eddy currents is shown in FIGURES 4 and 5 and comprises a plurality of elongated slots 202 that are cut through the side wall of the coil cup. If desired, slots 202 can be extended through the closure, such as 166, of the coil cup as is shown in FIGURE 4.

Another means adapted to reduce eddy currents induced in a metal transducer, which means can be used either alone or in combination with slots 202, comprises constructing the portion of shaft 152 that is intermediate the coil cups from a plurality of radial metal sections that are bonded together in assembly with an electrically nonconductive bonding material which hardens to form a rigid shaft member between the coil cups. In the embodiment of this invention in which the coil cups are joined by metal sleeve 170 as described above, the sleeve itself can be constructed of a plurality of arcuate segments bonded together and to shaft 152 by an electrically nonconductive bonding material. Any conventional electrically nonconductive bonding material, such as thermosetting resins and plastics, can be used to form, from sections thereof, a rigid shaft or sleeve between the coil cups. A shaft or sleeve so constructed is, in effect, a slotted shaft or sleeve having a slot 204, as shown in FIGURE 4, filled with bonding material.

The number of slots 202 and slots 204 included in the structure of transducer 150 is determined by the operating conditions of a particular use of the electromechanical drive means of this invention. It should be noted, however, that the use of one slot 202 and/or one slot 204 effects a substantial decrease in the magnitude of the eddy currents induced in the transducer and that, in particular instances, as many as twelve slots 202 have been cut in the side wall of the coil cup with a substantial reduction of the magnitude of the induced eddy currents resulting from the addition of each slot. In addition to reduced the magnitude of the induced eddy currents, the use of slots 202 and 204 also reduces substantially the total weight of the transducer, thereby reducing the electrical energy required to actuate the driving means and improving the operating efficiency thereof. In another embodiment of this invention, the weight of transducer 150, and eddy currents induced in the transducer, can be reduced by cutting through the closure such as 166, one or a plurality of ports 206.

In the construction and use of a transducer within the purview of this invention, the structural elements comprising the coil cup slots 202, the slots 204 in the shaft 152 or sleeve 170, and the ports 206 in the coil cup closure can be employed singly or in any combination depending upon the requirements and conditions of the particular instance in which this invention is used. In addition, either of the conduit means described above can be employed in combination with any one, or any combination of, the slots and ports.

In a further improvement in the apparatus of this invention, the transducer is constructed of anodized aluminum to reduce the electrical conductivity of the transducer while maintaining substantially its thermal conductivity. In operation, the improved electromechanical drive means of this invention is actuated and functions in the same manner as the less efficient and, in certain circumstances, in operable apparatus described in the prior art. The transducer of this invention can be reciprocated linearly at a continuous variable velocity within the range of from zero to about 10 centimeters per second and from zero to 60 centimeters per second with system linearity better than about one percent over 95 percent of the half-period of the velocity wave form, and velocity calibration is ±1.0 percent reproducible to ±0.5 percent. The total displacement of the reciprocating shaft is approximately 2.5 millimeters in either direction from its rest position, for a total obtainable displacement of five millimeters.

The improvements resulting from the modifications of the transducer structure in accordance with this invention are indicated by a comparison of that apparatus with the transducer described in the prior art. A typical prior art transducer, such as that shown in FIGURE 3 that is constructed of Bakelite, has a weight of approximately 37 grams including the weight of the coils wound thereon, consisting of a drive coil having three times 63 turns of 0.005 inch wire and a pickup coil having three times 350 turns of 0.002 inch wire. An anodized aluminum transducer of this invention, having 12 slots in each of the coil cups, four ports in the closure of each coil cup, and having mounted thereon exactly the same type of coils mounted on the Bakelite transducer, has a total weight of 34 grams and is operable continuously and indefinitely in evacuated and cryogenic environments. Furthermore, a typical electromechanical drive means, having included therein the transducer described in the prior art, has a radial air gap; that is, the distance between the adjacent surfaces of the cylindrical magnetic member and the annular magnetic member, of approximately 0.166 inch. The electromechanical drive means containing the transducer of this invention has a radial air gap of approximately 0.140 inch, thereby permitting a reduction of approximately 15 percent in the size of the radial air gap. That modification of structure increases the magnitude of the magnetic force in the air gap by about 10 percent when the transducer of this invention is employed, thereby reducing the amount of current required to actuate the transducer with a resultant reduction in heat generated of about 40 percent.

The preceding detailed description of various structural embodiments of the apparatus of this invention is presented to describe distinctly and point out particularly the nature and scope of the invention disclosed herein. Such explicit description is not intended to exclude from the purview of this invention those equivalent structural elements and modifications thereof that are obvious to one skilled in the art in view of the disclosure made herein, and the scope of the invention described herein is delineated by the following claims.

What I claim is:

1. In apparatus for detecting nuclear resonant absorption of radiation passing through a material containing the absorbing nuclei, said apparatus having drive means comprising,
    a housing,
    a pair of magnetic means secured within the housing in spaced relation with each other,
    the combination of the housing with the pair of spaced magnetic means forming a chamber therebetween,
    each of the magnetic means having a radial air gap therein,
    the housing and magnetic means having a passage extending longitudinally therethrough concentric with the radial air gaps,
    and a pair of resilient metallic support members secured at opposite ends of the housing adjacent and spaced from the ends of the longitudinal passage,
    each of the resilient support members having a hole therethrough concentrically aligned with the passage,
    the improvement consisting of an electromechanical transducer comprising,
    an elongated metallic shaft extending through the passage with its ends slidably secured in the holes through the support members and with the shaft mounted in spaced relation to the surfaces of the magnetic means and the surfaces of the housing, metallic coil mounting means comprising a drive coil cup and a pickup coil cup integral with the shaft and spaced from each other within the chamber between the magnetic means, each of the coil cups comprising a tubular side wall surrounding the shaft and having, at the end of each coil cup that is adjacent the other coil cup, a closure integral with the shaft, each of the coil cups having its open end extending into the air gap of the adjacent magnetic means with the surfaces of the coil cup spaced from the surfaces of the magnetic means, a circumferential coil channel cut in the outer surface of the side wall of each coil cup in the portion thereof within the air gap, electrical drive connecting means integral with the side wall of the drive coil cup near the closed end thereof within the chamber, electrical pickup connecting means integral with the side wall of the pickup coil near the closed end thereof within the chamber, a drive coil mounted on the channel of the drive coil cup with the ends of the coil wires secured to the electrical drive connecting means, a pickup coil mounted in the channel of the pickup coil cup with the ends of the coil wires connected to the electrical pickup connecting means, each of the coils and channels being constructed and arranged such that the outer radius of the coil measured from the longitudinal axis of the shaft is not greater than the outer radius of the side wall of the coil cup measured from the longitudinal axis of the shaft, and each of the drive coil cup and the pickup coil cup having conduit means extending from the open end thereof toward the electrical connecting means near the closed end thereof, said conduit means being constructed and arranged such that the coil leads extending from each coil toward its associated electrical connecting means are below the outer surface of the coil cup side wall over that portion of the side wall that is interposed in the air gap.

2. Apparatus as described in claim 1 wherein the coil cups are unitary with the shaft, and wherein the portion of the shaft between the closed ends of the coil cups comprises a plurality of separate elongated shaft sections that are bonded together with an electrically nonconductive material to form in assembly a rigid elongated shaft intermediate the coil cups.

3. Apparatus as described in claim 1 wherein the coil mounting means comprises a tubular sleeve having the drive coil cup integral with one end thereof and the pickup coil cup integral with the other end thereof, said tubular sleeve adapted to provide stationary engagement between the inner wall of the sleeve and the surface of the shaft when the coil mounting means is mounted on the shaft, and wherein the sleeve comprises a plurality of elongated arcuate segments that are bonded together in assembly by an electrically nonconductive material.

4. Apparatus as described in claim 1 wherein each of the coil cups has cut through the side wall thereof a plurality of elongated slots parallel to the longitudinal axis of the shaft.

5. Apparatus as described in claim 4 wherein some of the slots cut through the wall of each of the coil cups, extend from the open end of the cup through the channel and through part of the distance along the coil cup side wall between the closure and the channel, and in which other of the slots formed in the cup extend from the open end of the cup, through the channel, through the rest of the coil cup wall, and through the closure down to the shaft.

6. Apparatus as described in claim 1 wherein each of the coil cups has conduit means comprising a plurality of sets of apertures extending through the side wall of the cup with each set of apertures positioned in a substantially straight line extending from the open end of the coil cup to the electrical connecting means near the closed end of the coil cup, alternate pairs of apertures in each set being connected by a groove formed in the outer surface of the coil cup side wall, and wherein the leads from the assembled coils are threaded through the apertures and grooves alternately along the inner and outer surfaces of the coil cup to the electrical connecting means.

7. Apparatus as described in claim 6 wherein each of the coil cups has a plurailty of slots cut through the side wall thereof in spaced relation with each other and with the sets of apertures and grooves, said plurality of elongated slots being positioned in parallel relation with the longitudinal axis of the shaft.

8. Apparatus as described in claim 1 wherein the conduit means comprises a plurality of elongated slits cut through the side wall of each of the coil cups and extending from the open end of each cup to within the chamber, near the electrical connecting means integral with that cup, said slits positioned in spaced relation with each other and parallel to the longitudinal axis of the shaft, and a flexible deformable tube of electrically non-conductive material secured within each of said slits, said flexible deformable tube having an outer diameter such that the tube is held in compression in the slit and an inner diameter such that the leads from the coils can be passed therethrough from the channel to the electrical connecting means.

9. Apparatus as described in claim 8 wherein each of the coil cups has a plurality of slots cut through the side wall thereof in spaced relation with each other and in spaced relation with the slits, said plurality of elongated slots being positioned in parallel relation with the longitudinal axis of the shaft.

10. Apparatus as described in claim 1 wherein the closure of each of the coil cups has a plurality of ports extending therethrough.

11. Apparatus as described in claim 1 wherein the shaft and the coil mounting means are constructed of anodized aluminum.

References Cited

UNITED STATES PATENTS

| | | | |
|---|---|---|---|
| 2,776,560 | 1/1957 | Erath et al. | 310—27 XR |
| 2,785,356 | 3/1957 | Nisle | 318—128 |
| 2,820,158 | 1/1958 | Mason | 310—15 |
| 2,832,903 | 4/1958 | Carter | 310—27 |
| 2,870,350 | 1/1959 | Olson | 310—27 |
| 3,149,254 | 9/1964 | Carter et al. | 310—12 |

MILTON O. HIRSHFIELD, Primary Examiner

D. F. DUGGAN, Assistant Examiner

U.S. Cl. X.R.

310—27; 318—128, 135